Oct. 23, 1951    F. GRIEDER    2,572,137
TUBE SEVERING MACHINE
Filed May 11, 1949    9 Sheets-Sheet 5
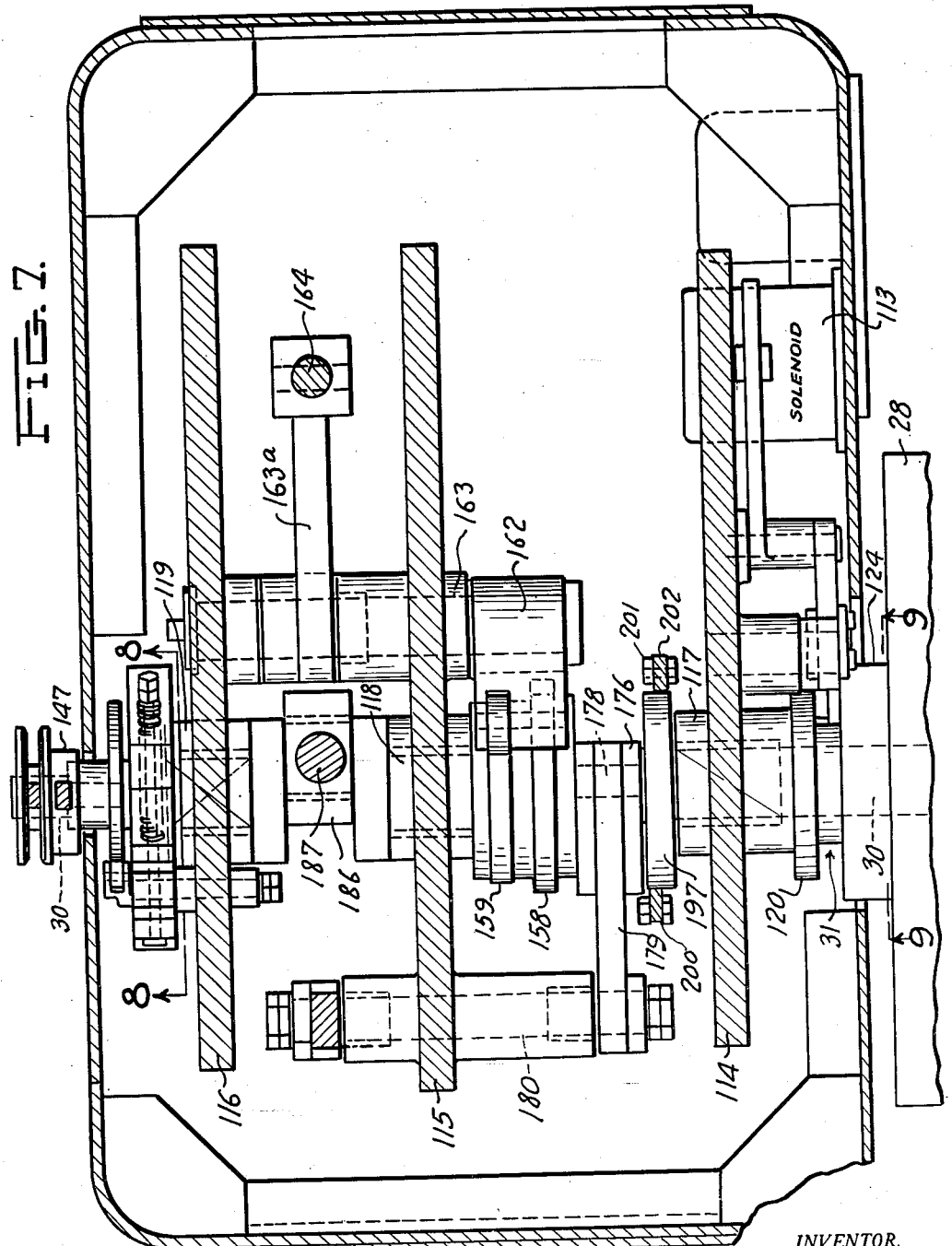
INVENTOR.
Fred Grieder
BY
ATTORNEYS Oct. 23, 1951        F. GRIEDER        2,572,137
TUBE SEVERING MACHINE
Filed May 11, 1949        9 Sheets-Sheet 6
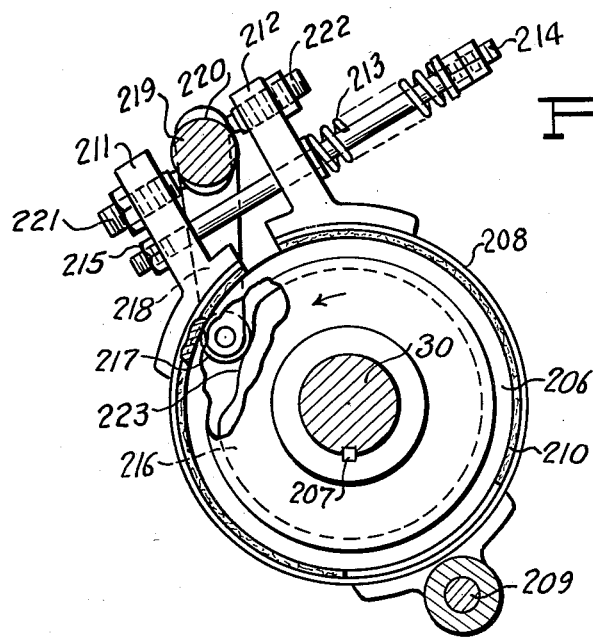
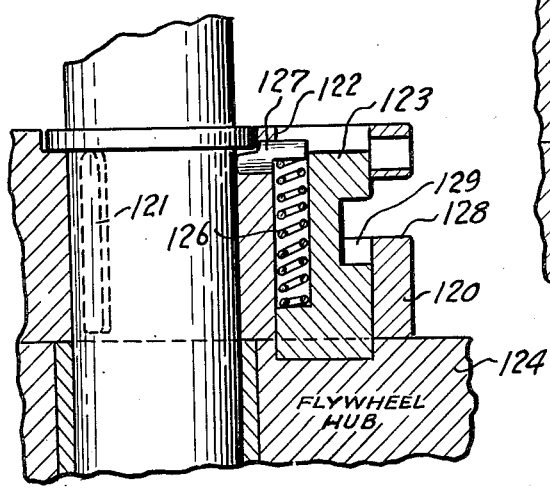
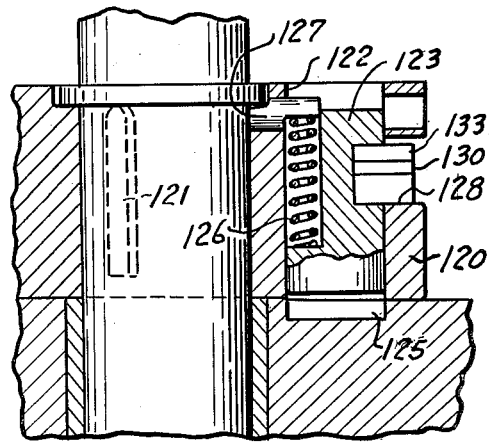
INVENTOR.
Fred Grieder
BY
ATTORNEYS

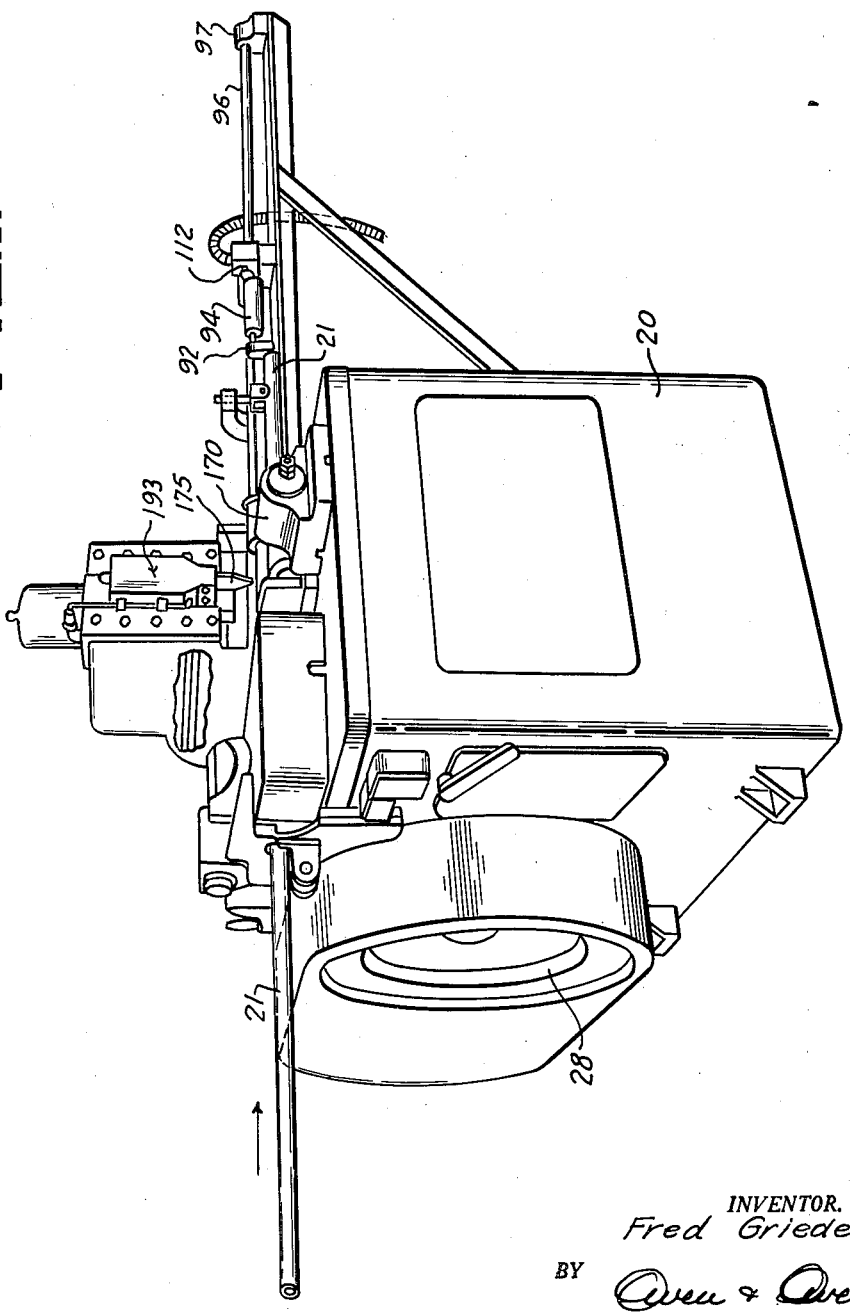

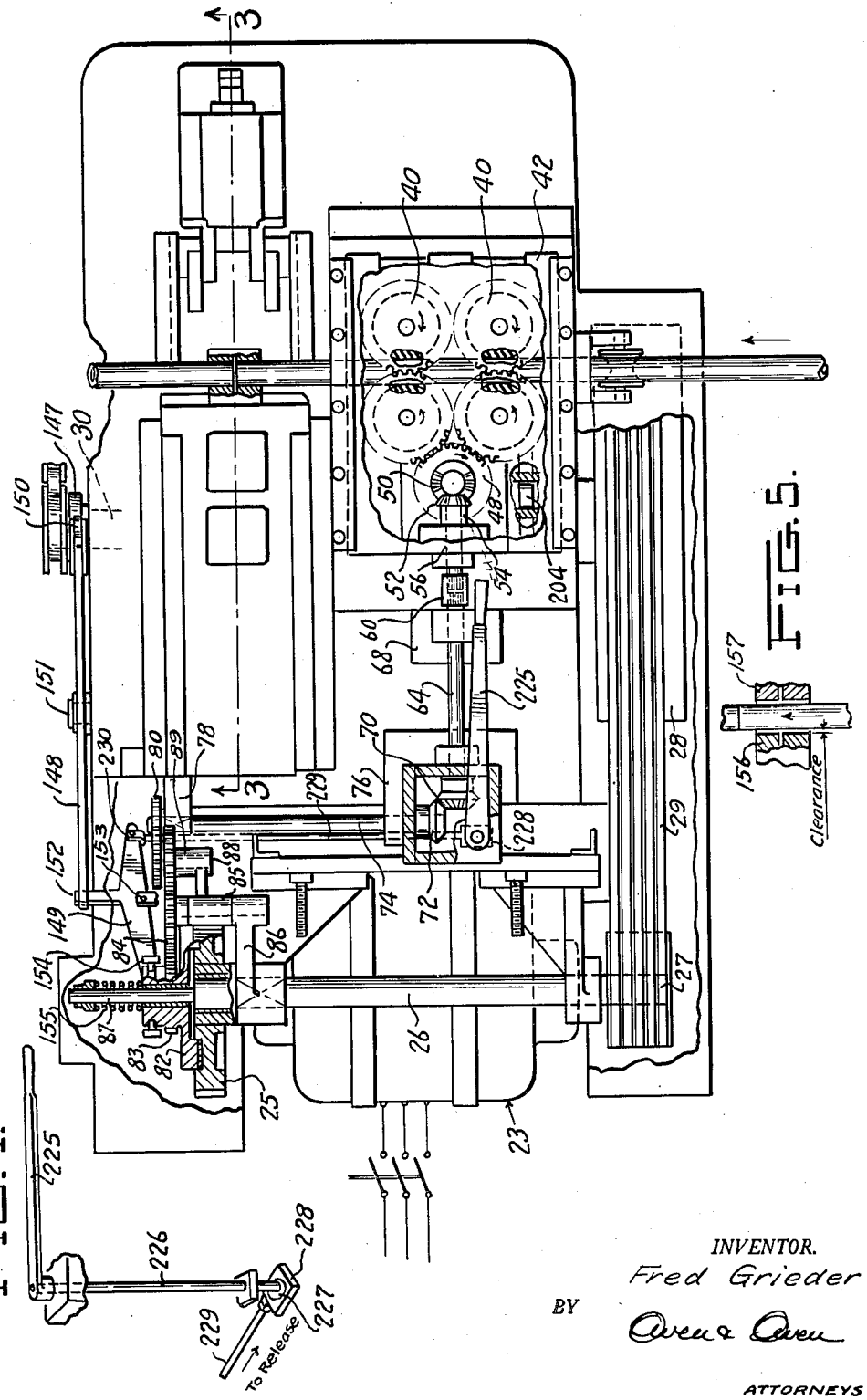

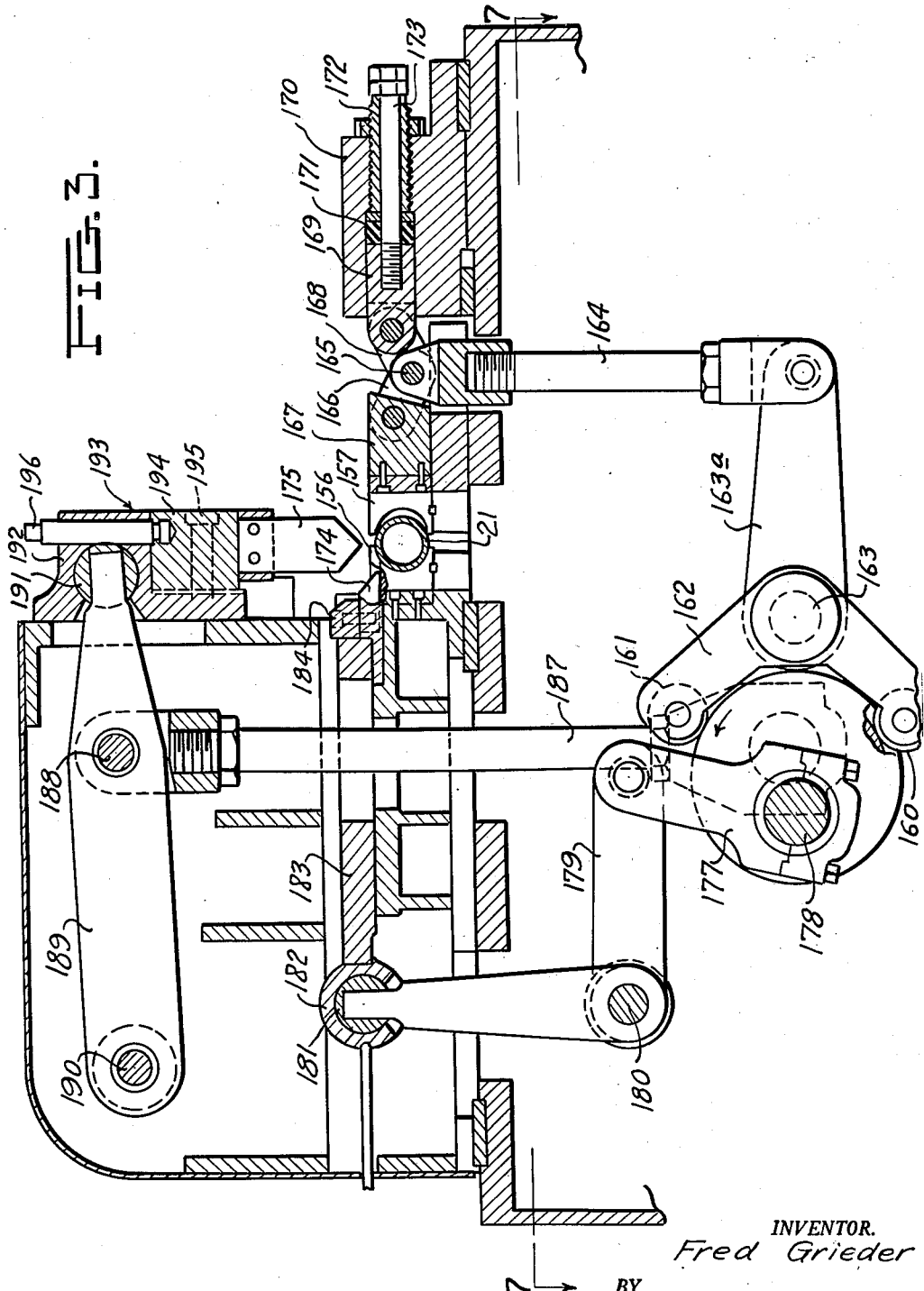

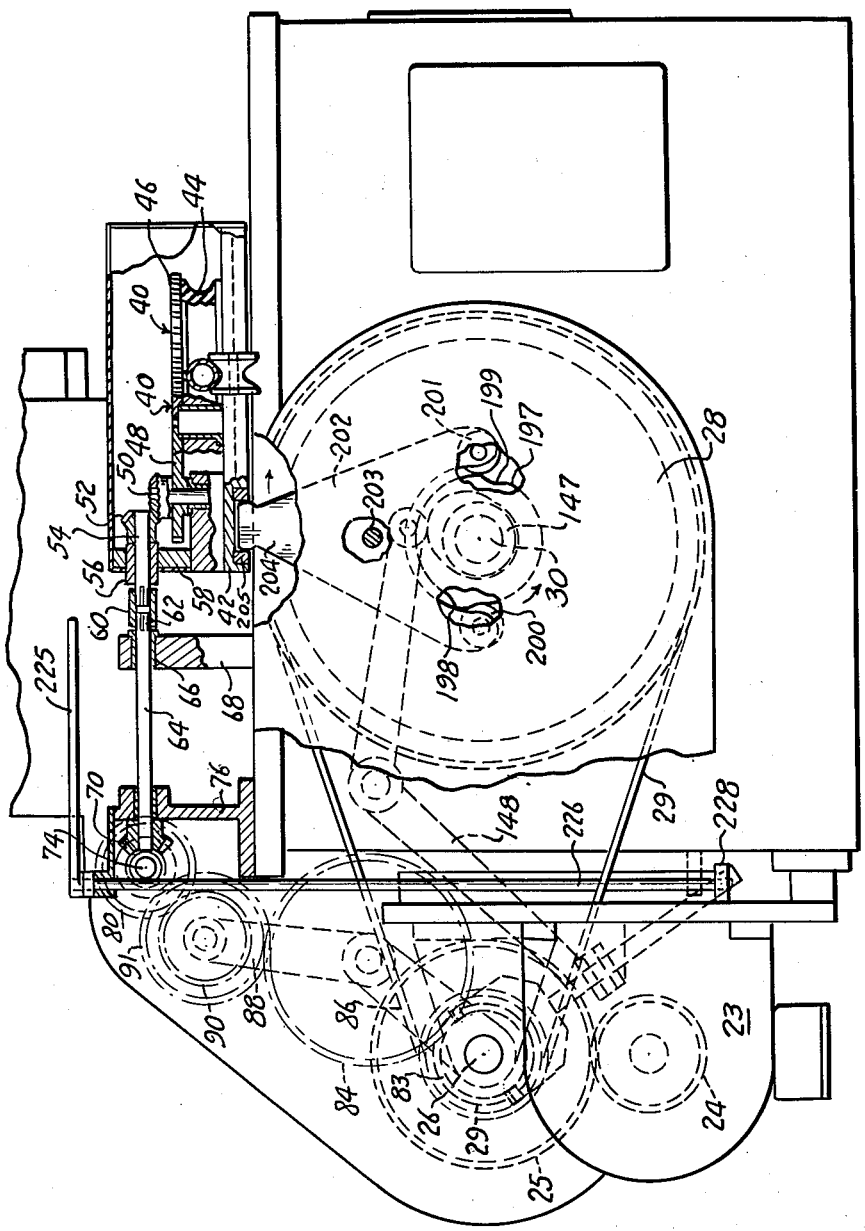

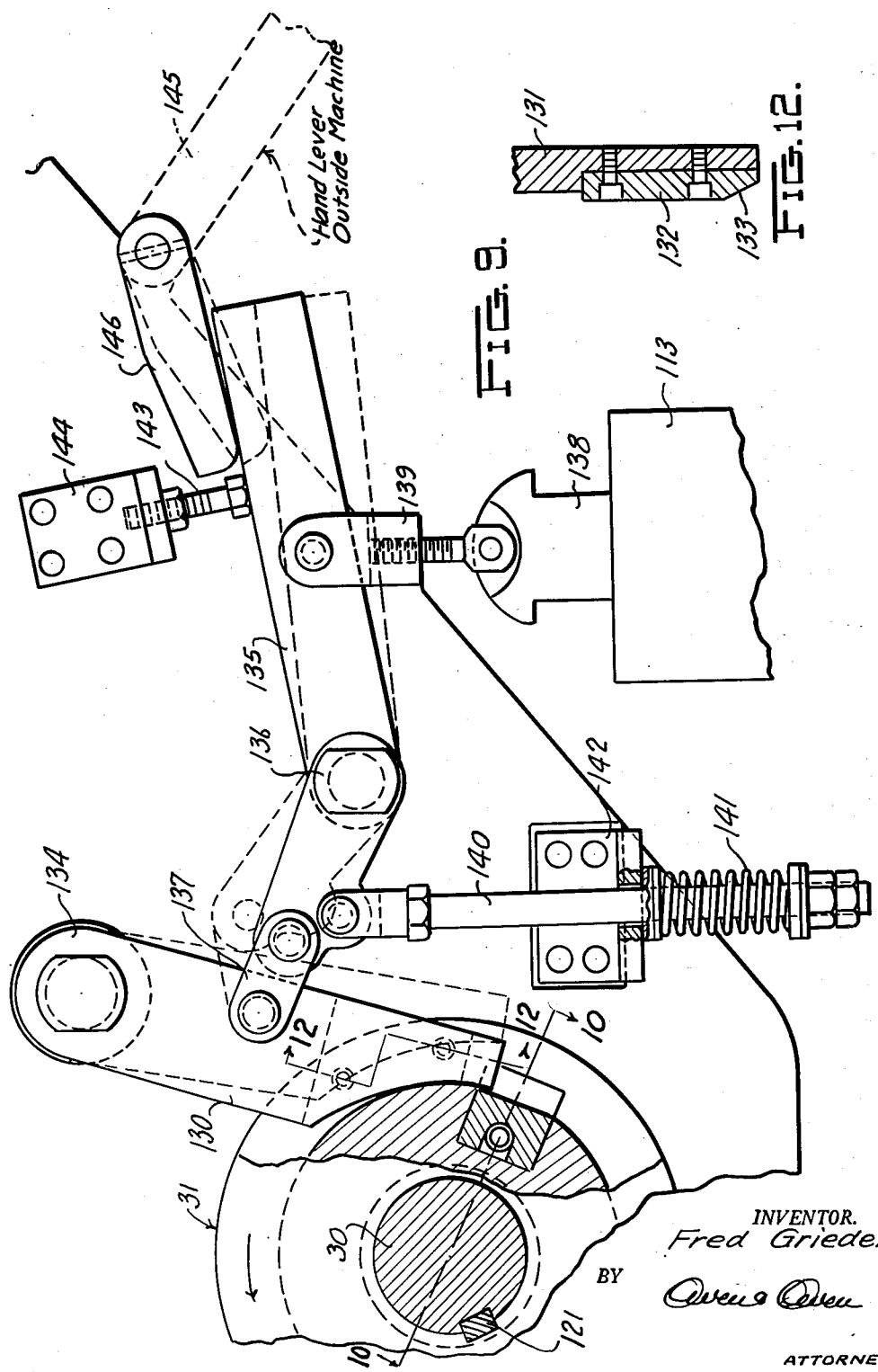

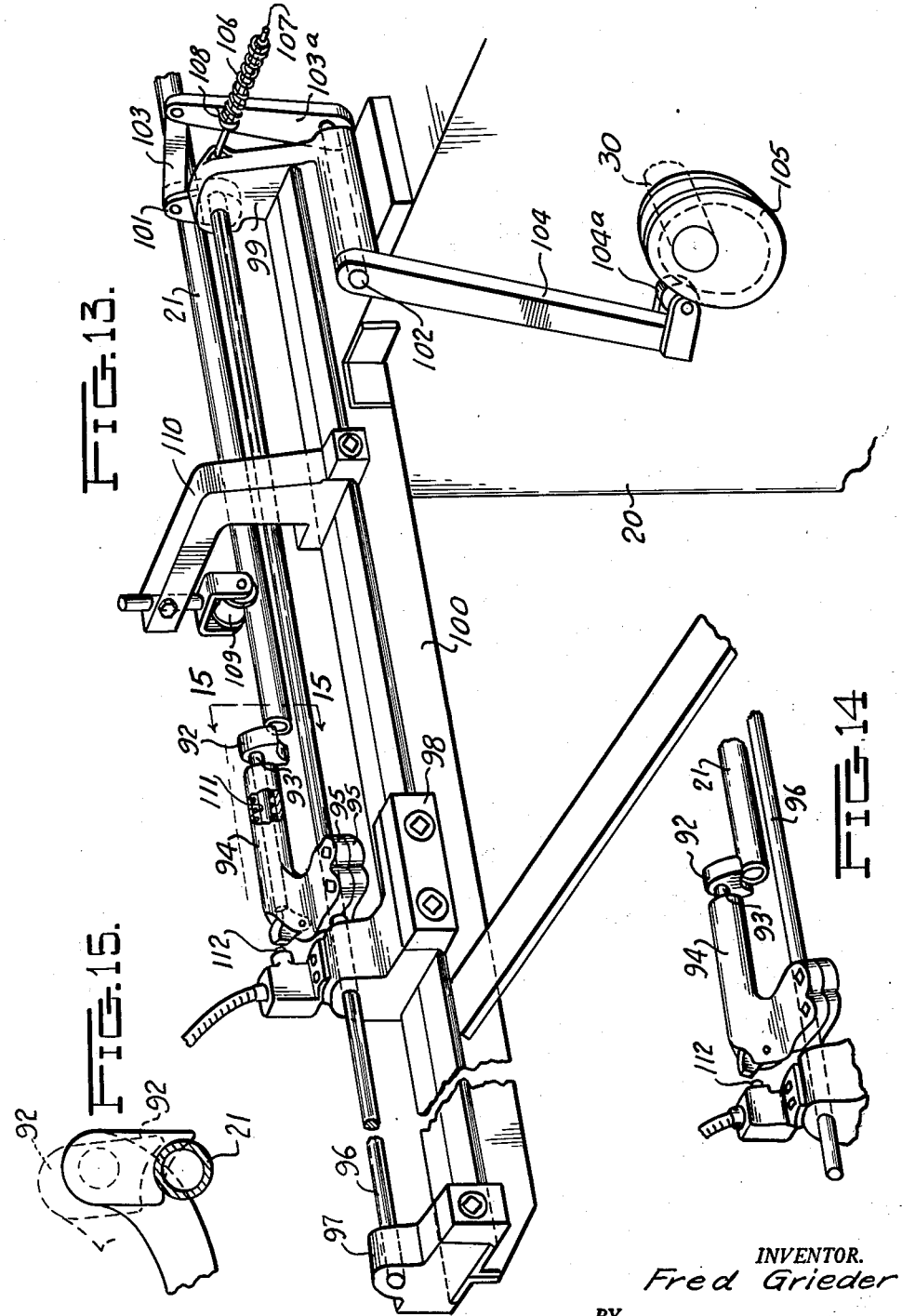

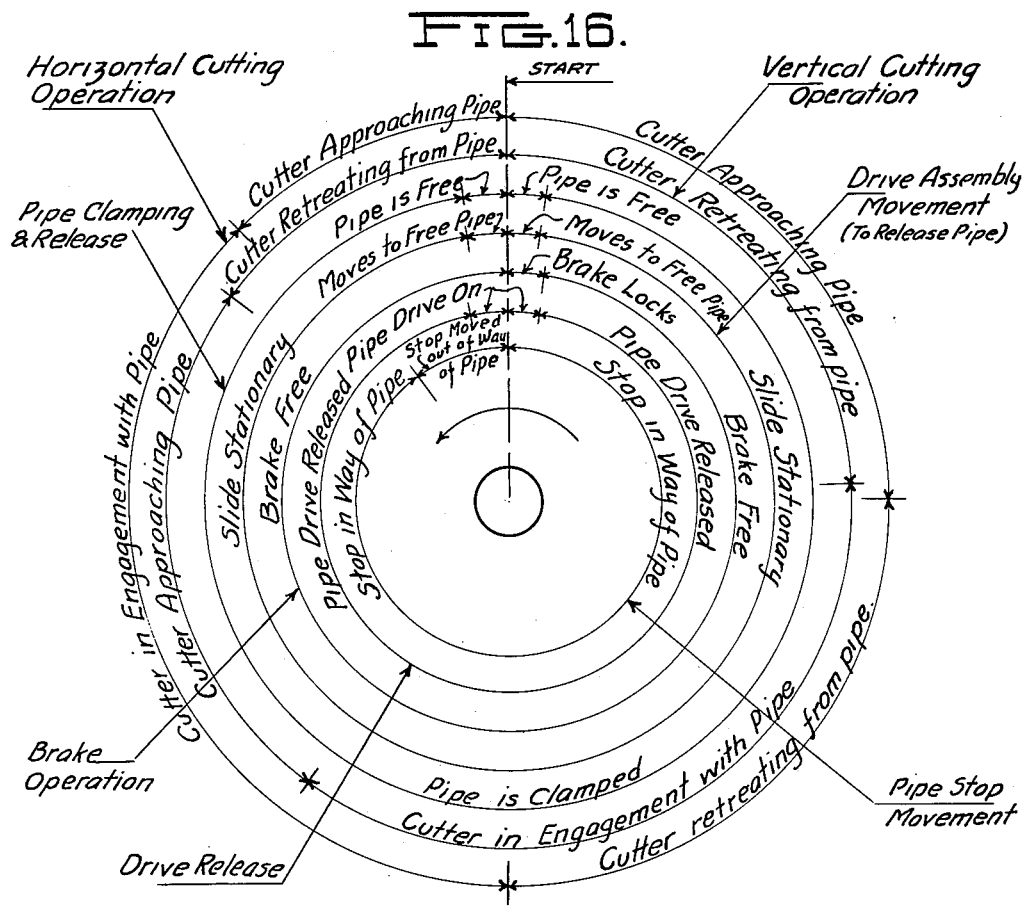

Patented Oct. 23, 1951

2,572,137

UNITED STATES PATENT OFFICE 2,572,137

TUBE SEVERING MACHINE

Fred Grieder, Bowling Green, Ohio

Application May 11, 1949, Serial No. 92,567

6 Claims. (Cl. 164—49)

This invention relates to machines for severing tubes or the like and is particularly directed to an automatic device adapted to feed stock into position adjacent appropriate cutting tools and to cut off predetermined lengths of the stock.

The primary object of the invention is to provide an operating mechanism for a machine of this character which operates rapidly through repeated cycles and which is so arranged that mistiming of the various portions of the cycle is substantially impossible.

Another object of the invention is to provide a stock feeding mechanism for a tube cutting machine in which cut pieces are removed from the cutting station in such a manner that the likelihood of jamming of the mechanism is greatly reduced.

Still another object of the invention is to provide an automatic tube cut-off machine which includes means for resiliently clamping the tube in place which permits slight variations in tube size and shape without collapsing the tube by the clamping action.

A further object of this invention is to provide a tube severing device wherein all movable elements are actuated from a single drive shaft whose operation depends upon the feeding of a predetermined length of tubing to the machine.

Other objects and advantages of the invention will become apparent from the following detailed description of a preferred embodiment, reference being had to the accompanying drawings in which—

Fig. 1 is a perspective front view of a machine embodying the present invention; Fig. 2 is a top view with parts broken away of the machine; Fig. 3 is a partial section on line 3—3 of Fig. 2; Fig. 4 is a diagrammatic detailed view of a manually operated clutch controlling lever; Fig. 5 is a fragmentary front view with parts broken away, showing a released position of a severed tube and associated gripping jaws in one position of operation; Fig. 6 is a fragmentary view of the machine, with parts broken away showing a feed roll driving and oscillating mechanism; Fig. 7 is a horizontal section taken below the bed plate of the machine approximately on line 7—7 of Fig. 3; Figs. 8 and 9 are sections on line 8—8 and 9—9, respectively, in Fig. 7, certain parts being broken away in Fig. 9; Figs. 10 and 11 are sections on line 10—10 in Fig. 9; Fig. 12 is a detail view of a clutch operating dog; Fig. 13 is a fragmentary perspective view of the stock limiting and gauging mechanism; Fig. 14 is a fragmentary perspective view of the stock gauging device in one position of its operation; Fig. 15 is a section on line 15—15 of Fig. 13 showing two positions of movement of the stock gauging member and Fig. 16 is a sequence diagram.

Referring to the drawings, and particularly to Figs. 1 and 2, the machine consists of a body or housing 20 in and on which the operating mechanism is carried. As indicated, the machine is intended to cut predetermined lengths of tubing from a stock piece designated 21 entering the machine from the left and ejecting cut pieces at the right. The cut pieces are received in any suitable bin not shown.

One method of successfully severing lengths of relatively thin wall tubing is first to make a substantially tangential cross-cut in the tubing, withdraw the knife that has made the cross-cut and complete the severing by a second knife entering at a right angle to the slot or opening made by the first. Details of this method will be brought out later in this description. It is apparent then that the stock piece 21 must be fed into the machine, a predetermined length gauged off, the stock gripped firmly to hold it during the cutting operation, and after the cutting operation, ejected from the machine. The present invention provides means to initiate the gripping and cutting parts of the cycle from the gauging and feeding movements of the stock and initiating the next successive feeding movement upon completion of the cutting cycle. The two cycles, feeding and cutting, are made independent so that the time involved in feeding may be greater or less depending on the length of tubing and speed of operation of the feed mechanism without in any way affecting the cycle of operation of the cutting elements.

Both the stock feeding and the tube severing mechanism are driven from a common motor 23 fixed at the rear of the machine bed and driving a pinion 24 which meshes with a drive gear 25 on a shaft 26. The shaft 26 extends laterally across the rear of the machine and at one end carries a sheave 27 which drives a flywheel 28 through a multiple strand belt 29. Flywheel 28 is mounted for free rotation on the end of a central machine shaft 30 and is adapted to be clutched to the shaft by a dog clutch 31, as hereinafter described. Shaft 30 drives all of the tube gripping and cutting mechanisms and, in addition, at the end opposite the flywheel 28 is provided with a cam which initiates the feed roll drive for stock feeding. The details of the sequential movements of the various parts will be described in connection with the operation of the machine.

The machine is provided with feed rolls 40 preferably disposed in adjacent pairs as indicated in Fig. 2. Each roll comprises a beveled body mounted on its axis of rotation on a reciprocable slide 42, and includes a rubber or other resistant gripping surface 44, the contour of which is made to conform generally to the contour of the tubing intended to be gripped by the rolls. In addition, each roll is provided with a gear 46 which meshes with a similar gear on its adjacent roll so that each pair of gears is driven together in opposite directions. The two pairs of rolls are driven from a common drive gear 48 which is also mounted on the slide 42 and which is preferably made as a cluster with bevel gear 50. Bevel gear 50 is in mesh with a similar beveled driving unit 52 on the end of a stub-shaft 54 journaled as at 56 in a rear wall 58 of the slide 42. The stub-shaft 54 has a splined connection with a sleeve 60 and the sleeve also engages the splined end 62 of a drive shaft 64 journaled as at 66 in an upstanding, stationary frame part 68. By reason of the splined connection 60 relative linear motion between shaft 64 and stub-shaft 54 can be imparted without disturbing the driving relation of the two shafts.

At its rear end, shaft 64 carries a bevel gear 70 which meshes with a similar bevel gear 72 on a back-shaft 74 journaled in brackets 76 and 78 at the rear of the machine. Beyond bracket 78 shaft 74 carries a gear 80 which meshes with a system of idler gears as indicated in Fig. 6. If shaft 26 and shaft 74 were maintained in perfect alignment and on perfectly spaced centers it would be possible to drive directly through gearing on fixed centers. However, it is not always possible to maintain perfect spacing and alignment of the shaft parts so that the system of idler gearing embodied in the present machine is so mounted as to compensate for variations in the spacing of the shaft centers. The drive for shaft 74 originates, of course, in shaft 26. A suitable clutch indicated generally at 82 is provided to derive driving force for the feed roll drive shaft 74 from shaft 26.

Clutch 82 is journaled over a reduced extension 87 of shaft 26 and carries a pinion 83 which meshes with a first idler gear 84 journaled in a bracket 85 which includes an extension 86 mounted for relatively free swinging movements over shaft 26. Bracket 85 also includes a second upstanding pivoted arm 88 which carries a journal 89 on which a second idler set 90, 91 is mounted with gear 90 in mesh with gear 80. The drive for shaft 74 is thus through clutch 82, pinion 83, gear 84, idler 91, idler 90 and gear 80. It will be apparent that whenever clutch 82 is engaged, rotative movement is imparted to shaft 74 and thus idler gears 70, 72, shaft 64, stub-shaft 56, bevel gears 50, 52 and gear 48 to the feed rolls 40.

The stock 21 is fed past the cutting stations by the feed rolls 40 until it engages a stop 92. This stop is mounted upon a rod 93, which is slidably positioned within a cylindrical member 94. Suitable clamping members 95 are provided which are integral with the cylindrical member 94 and which are designed to adjustably support the cylindrical member 94 upon a support axle 96. Brackets 97, 98 and 99 are mounted upon a support arm 100 and have aligned apertures in which the support axle 96 is rotatably mounted. At one end of the support axle 96 is located a rocking lever 101 which is connected to a rock shaft 102 by a link 103 and rock arm 103ᵃ, the link 103 being pivotally connected both to the rocking lever 101 and the rock arm 103ᵃ. At the other end of the rock shaft, a rock arm 104 carrying a roller 104ᵃ engages a cam 105 mounted upon the main drive shaft 30. A spring 106 positioned upon a rod 107, which is attached to the bracket 99 at one end and which passes through an eyelet 108 in the rock arm 103ᵃ, bears against the eyelet 108 so as to rotate the support axle 96 to a position such that the stop 92 is disposed in the path of the stock 21, as shown in full lines in Figure 13. When the high part of the cam 105 pushes back that end of the rock arm 104 bearing the roller 104ᵃ, the upper end of the rock arm 103ᵃ moves against the pressure of the spring 106 and acts upon the rocking lever 101 through the link 103, so as to rotate the support axle 96 in order to move the stop 92 out of the path of the stock 21, as shown in Figure 14. The actual movement of the stop 92 is shown both in Figure 13 and in Figure 15.

A guide roller 109 is mounted upon a bracket 110 for the purpose of aligning the stock 21 with the stop 92. A plurality of similar guide rollers may be supported to engage above or below the stock to assure accurate lineal feeding movements. As the stock 21 moves forwardly and is forced against the stop 92, it forces the rod 93 rearwardly against the pressure of a spring 111, which tends to hold the stop 92 in the extended position. As the rod 93 continues to be moved rearwardly by the advancing stock piece, it contacts an electrical switch 112 which energizes an electrical circuit that includes a solenoid 113. This solenoid controls the clutch 31 for the main drive shaft 30, as will be hereinafter described.

The drive shaft 30 is mounted in longitudinal frame supports 114, 115 and 116, as shown in Figure 7, which may be cast or welded into the machine frame. Main bearings 117, 118 and 119 are provided to journal the drive shaft 30 in supports 114, 115 and 116, respectively. The clutch mechanism for the main drive shaft 30 is a single cycle, dog type clutch designated generally 31, which includes a clutch plate 120 keyed to the main shaft 30 by a key 121. As shown in Figures 10 and 11, the clutch plate 120 has a recess portion 122, in which is mounted a dog 123. The flywheel 28 is formed with a hub 124 containing a plurality of sockets 125 which are aligned radially with the dog 123 to permit the dog to engage therein. A spring 126 is mounted within the dog 123 and bears against a stop 127 so as to urge the dog into engagement with the socket 125, as shown in Figure 11. The clutch plate 120 is formed with an annular groove 128 therein which is aligned with a diagonal slot 129 in the dog 123.

The dog 123 is held in the disengaged position shown in Figure 10 by a wedge 130, which is shown in detail in Figure 12. This wedge comprises a plate 131 to which is attached a suitable metal insert 132 having a bevel 133 upon its forward end. The wedge 131 is pivoted, as shown at 134, and is withdrawn from the path of the clutch dog by a mechanism which includes a rock lever 135 pivoted at 136 and attached to the wedge 130 by a link 137. The solenoid actuates an armature 138 which is pivotally attached by a link 139 to the rock lever 135. When the solenoid 113 is energized, the armature 138 moves downwardly, thus raising the opposite end of the lever 135 and withdrawing the wedge 130 from the path of the clutch dog, as shown in dotted lines in Figure 9. When the solenoid 113 is deenergized, the wedge 120 is returned to the fullline position shown in Figure 9 where it can engage with the dog 123. Engagement is assured by a rod 140 urged downwardly by a spring 141 seated against a bracket 142. An adjustable stop screw 143 is mounted in a bracket 144 above the rock lever 135 in order to limit the movement of the dog retracting wedge 130 toward the clutch plate 120. As shown in Figure 9, a hand lever 145 is provided, which is attached to a finger 146 that bears upon the free end of the rock lever 135, thus permitting manual operation of the drive shaft clutch 31.

As soon as rotation is imparted to the main drive shaft 30 by engagement of the main drive clutch 31, a cam 147 (Fig. 2) mounted thereon disengages the feed roll clutch 82 through a bell crank lever 148 and a shifting yoke 149. When a roller 150, mounted upon one end of the bell crank lever 148, engages the high part of the cam 147, it rotates the bell crank lever about its pivot 151 and forces the opposite end of the bell crank lever against a tongue 152 forming an integral portion of the yoke 149. The downward movement of the bell crank lever against the tongue 152 rotates the yoke 149 about its pivot 153, so as to shift fork fingers 154 positioned at the end of the yoke 149. The fingers 154 are slidably mounted in a shifting collar portion of the clutch 82, and the movement imparted to the yoke and fingers disengages the clutch 82 by moving it along the reduced extension 87 of the drive shaft against the action of a spring 155, which normally holds the clutch 82 in engagement with the constantly rotating gear 25.

As the main shaft 30 continues to rotate, the low point of the cam 147 is brought into engagement with the roller 150, thus reversing the direction of movement of the bell crank lever 148, the yoke 149 and the clutch collar to again permit spring 155 to engage the clutch 82 with the gear 25. This engagement, of course, takes place only when the feed rolls are to be driven. The drive to the feed rolls is interrupted, as above set forth, immediately upon rotation of the main drive shaft 30.

The feed roll clutch 82 may also be operated manually by a hand lever 225 (Figure 4) affixed to a shaft 226 having an eccentric 227 attached to its lower end. This eccentric is mounted in a block 228 affixed to a rod 229 which is coupled at 230 to the yoke 149. Movement of the eccentric 227 within the block 228 reciprocates the free end of the yoke 149 to engage or to disengage the clutch 82.

In the automatic operation of the machine, the stock is moved into place by the feed rolls and is clamped between die blocks, as in a vise comprising a stationary block or jaw 156 and a movable block or jaw 157, as shown in Figure 3. The die blocks are spaced as shown in the plan sectional view of Figure 5, to permit passage therethrough of both the horizontal cutter and the vertical cutter. A groove extending across complementary faces of the dies or jaws permits passage of the horizontal cutter, while slots between each jaw adjacent the tube gripping portion permits passage of the vertical cutter. The motion of the movable jaw toward the stationary jaw of the vise is originated by a pair of complementary cams 158 and 159 on shaft 30 (Fig. 7). These cams are so formed that cam followers 160 and 161 mounted in a V-shaped arm 162 will ride, alternatively, upon the high and low portions thereof. The arm 162 is connected through a rock shaft 163 to a lever 163ª which in turn is pivotally connected to a toggle operating rod 164. Rock shaft 163 is journaled in any suitable bearing in support 115. A knee 165 is formed upon the upper end of the toggle bar 164 and is a pivoting point for one arm of a toggle link 166, which is connected to a slide member 167 in which the movable jaw 157 is mounted. The other arm of the toggle link is designated 168 and is pivotally connected to a backing member 169, which is slidably mounted within a bracket 170. A washer 171 or packing of resilient material is interposed between the backing member 169 and a hollow cylindrical adjustment screw 172 to hold the backing member 169 in position against the resilient washer 171. It will be seen that as the cam follower 160 contacts a high portion of the cam 158 and the cam follower 161 contacts a low portion of the cam 159, the toggle operating rod 164 is moved upwardly by the lever 163ª, thus forcing the jaw 157 toward the jaw 156 and around the stock 21. Since the backing member 169 is freely slidable and is mounted against the resilient washer 171, a certain amount of resilience in the grip of the movable jaw 157 is obtained so that over-thick stock pieces and similar irregularities cannot damage or jam the machine. The amount of resilience in the joint and the adjustment of the jaws 156, 157 may be controlled by the adjustment screw 172.

As previously described, the tube cutting mechanism of the present invention comprises a horizontal cutter blade 174 and a vertical cutter blade 175. Movement is imparted to the horizontal cutter blade 174 by means of a crank 176 mounted upon the drive shaft 30 (Figs. 3 and 7). A connecting rod 177 attached to a crank pin 178 forming part of the crank 176 is pivotally connected at the other end to a rock lever 179 which is pivoted about rock shaft 180 journaled in the frame support 115. At the opposite end of the rock shaft 180 a second rock lever is provided, at the upper end of which is mounted a ball 181 within a socket 182 forming a part of a slide 183, to which the horizontal cutter 174 is attached by a bolt 184. Slide 183 is gibbed in the machine frame in any suitable manner. As the crank pin 178 revolves about the axis of rotation of the main shaft 30, the rod 177 rocks the rock lever 179 about the axis of rock shaft 180 to impart a reciprocal motion to the slide 183 through the ball 181 and the socket 182. This motion is sufficient to carry the horizontal cutter blade 174 through the top portion of the stock 21 and back out of the path of the descending vertical cutter blade 175.

The vertical cutter blade 175 is a relatively narrow blade having its major dimensions perpendicular to the length of the stock. The blade is given a sinusoidal motion from the main shaft 30. A crank 186 (Fig. 7) drives a rod 187 which is pivotally connected at 188 to an arm 189. One end of the arm 189 is pivoted on a bearing 190, while the opposite end bears a ball 191 engaged in a socket 192 forming an integral portion of the sliding bracket, indicated generally at 193, which carries the vertical cutter blade 175. As the crank 186 moves the rod 187 in a vertical reciprocal motion, this same motion is imparted through the arm 189 to the bracket 193, which carries the blade 175. In order to permit a ready replacement of the blade 175, the blade is attached to a block 194, which in turn is attached to the bracket 193 by means of a bolt 195. The pin 196 aids in positioning the block 194. The slide 193 is gibbed in the front face of a top upstanding frame part in suitable guides.

Occasionally a burr or other deformity may be produced upon the stock 21 and become wedged in the slot in the stationary vise jaw 156, so as to jam the machine. The present invention provides a novel apparatus for avoiding this by moving the stock away from the stationary jaw 156, as shown in Figure 5, during the feeding movement. The mechanism for effecting this stock freeing movement may best be seen by referring to Figure 6, in which is shown a cam 197 mounted on the drive shaft 30 and having a land 198 and a groove 199 formed on opposite sides thereof. Cam followers 200 and 201 are mounted in a lever 202, which is pivoted at 203 and has an arm 204 extending into a recess in the slide 42, which is encompassed by a bearing insert 205. When the cam followers 200 and 201 contact the land 198 and the groove 197, respectively, the lever 202 pivots about the fulcrum 203 to move all of the feed rolls on the slide 42 to the right in Figure 6 due to pressure from the arm 204. As the cam 197 continues to rotate, the feed rolls 40 are again moved back to their normal position as the cam followers 200 and 201 once again ride upon the circular surface of the cam 197. Stock being fed between the feed rolls is thus given a lateral freeing movement with respect to the vise jaws, and this movement is timed by cam 197 to coincide with the beginning of the operation of the feed rolls. Not only is the stock freed by the lateral movement, but engagement which might cause scoring of the stock by the dies is eliminated since contact between the parts is prevented.

As previously described, the cam 105 mounted upon the drive shaft 30 actuates the mechanism which moves the stop 92 out of line of the stock 21. When this occurs, the solenoid 113 is deenergized and the spring tension member 140 moves the dog retracting wedge 130 back into the path of the clutch dog 123 in order to disengage the latter from the socket 125 of the flywheel when the dog is brought into engagement with the wedge 130 by the rotation of the flywheel. In order to reduce the movement of the main shaft 30 after disengagement of the clutch 31, a brake is provided, as shown in Figure 8, which includes a drum 206 keyed to the main shaft 30 by a key 207. A brake shoe 208 is hinged at 209 and has a liner 210 attached to the inside thereof. Opposite the hinge 209 a pair of lugs 211 and 212 are attached to the brake shoe 208 and are urged toward one another by means of a spring 213 mounted upon a bolt 214, which passes through lugs 212 and 211. A nut 215 prevents withdrawal of the bolt 214 from the lug 211, so that the spring 213 urges the lug 212 toward the lug 211. The brake is operated by a cam 216, which is mounted upon the drive shaft 30 and which carries upon its surface a cam follower 217 rotatably mounted in an arm 218. The arm 218 pivots about the axis 219 upon which is rigidly positioned an elliptical cam 220. The cam 220 is located between two adjustable bearing screws 221 and 222 positioned in lugs 211 and 212, respectively. When the cam follower 217 is in the depression 223 in the cam 216, the narrow dimension of the cam 220 is presented to the bearing screws 221 and 222, so that the brake liner 210 engages the drum 206 to effect a braking action on the main shaft 30. When the cam follower 217 rises upon the higher portion of the cam 216, the cam 220 rotates to spread the lugs 211 and 212 apart against the action of spring 213, thus releasing the brake.

In the operation of the machine just described, the stock 21 is fed through the feed rolls 40 past the cutting station and into contact with the stop 92. At this point in the operation, the feed roll clutch 82 is in engagement with the gear 25, and the main drive clutch 31 is disengaged from the flywheel 28, as shown in Figure 10. When the movement of the stock 21 forces the rod 93 into contact with the electrical switch 112, the solenoid 113 is energized, resulting in the downward movement of the armature 138 and the withdrawal of the wedge 130 from contact with the dog 123. Almost immediately the spring 126 forces the dog 123 into engagement with a flywheel socket 125 in the hub 124, so as to initiate rotation of the main shaft 30.

As the main shaft 30 begins to rotate, the feed roll clutch 82 is immediately disengaged from the gear 25 by the bell crank 148 and yoke 149 actuated by the cam 147 mounted on the main shaft 30.

Since operation of the electrical switch 112 stops the feeding of stock to the machine, the length of stock cut off will depend upon the location of the stop 92 and the switch 112. Variation in the length of the cut-off portions of tubing may be made by adjusting the clamping members 95 along the support axle 96.

As soon as the feeding movement of the stock 21 has stopped and rotation of main shaft 30 started, the stock is clamped between the jaws 156 and 157 and the horizontal cutter blade 174 moves across the top portion of the stock 21, cutting a tangential slot therein. As the horizontal cutter blade withdraws from the stock, the vertical cutter blade immediately moves downwardly through the slot in the stock cut by the horizontal cutter blade, and completely through the stock to sever a piece of predetermined length. Since movement of both cutter blades is derived from the same shaft, it is impossible for these two cutting mechanisms to get out of properly timed relation.

During operating of the stock gripping and cutting parts, cam 105 moves its associated system of rock levers 104 and 103 to cause oscillation of the long rod 96 to which the bracket 94 is fixed. The bracket is thus rotated, carrying the stop and gauge block 92 away from the end of the stock to the position indicated in Figure 14. Spring 111 which has been compressed by the advancing stock is now released and expands, forcing block 92 outwardly and away from bracket 94. As the oscillation of rod 96 is completed, the block 92 will drop down on the upper surface of the stock and will remain there until the severed piece is ejected by the next feeding cycle when it will again move down into the path of the uncut tube. Spring 106 supplements the weight of the bracket and block in properly positioning the latter.

When the stop 92 rotates out of the way of the stock 21, it also releases the switch 112, thus deenergizing the solenoid 113 so that the rotation of main shaft 30 is limited to a single turn. As shaft 30 completes its turn, the clutch dog 123 will engage wedge 130 causing the dog to be withdrawn from engagement with the flywheel. At this point in the cycle the brake 209, 210, is set, stopping the main drive shaft 30, and at this same point the feed roll clutch 82 is engaged, since cam 147 now presents its low point under the follower 150 on the lever 149 which operates the clutch yoke, so that the lever is released and the clutch 82 engaged by spring 155. This initiates another stock feeding cycle, and the entire operation repeats itself.

It will be obvious from the above description that the automatic cut-off machine comprising the present invention has many advantages. Among the more obvious advantages is the independent operation of the feed rolls and the cut-off mechanism, so that the length of tubing cut off is always the same regardless of any possible slippage of the feed rolls or change in speed with which the stock is fed to the machine. Also, the one-cycle clutch and brake devices mounted upon the main shaft are of such construction that precise timing is unnecessary, so long as the main shaft stops within range of the clutch. The stop mechanism, or gauging device, moves completely out of the way of the stock and springs forward so that it comes down upon the top of the stock when returned to normal position. Consequently, this movement makes it impossible for jamming to occur between the stock and the stop mechanism. Simple means are provided to permit the stop to be moved backwards or forwards and thus vary the length of the piece of stock to be cut off. By shifting the entire feed roll assembly, and thus moving the stock completely free from the stationary vise member, any possibility of jamming within the vise is eliminated. An additional feature of the vise is the provision of a resiliently mounted movable jaw which permits variations in the diameter and the shape of the tube being cut without collapsing the tube during the cutting operation.

It will also be apparent that many variations may be made in the specific embodiment of the invention disclosed in the accompanying drawings without departing from the scope of this invention. For example, the positioning and number of feed rolls may be varied to suit the individual situation. The size and shape of the cutting blades will vary, of course, with the size of stock being cut, the particular material forming the stock, etc. Furthermore, the cutting blades need not be horizontal and vertical, but may be positioned at any point about the circumference of the stock, it being necessary only that the severing cutter enter the stock through the groove formed by the first cutter. Although the particular vise mechanism disclosed in the drawings comprises a movable jaw and a stationary jaw, both jaws may be movable, if such construction is preferred. These and many other possible variations will be apparent to those skilled in the art.

What I claim is:

1. A tube severing machine, which comprises a plurality of opposed feed rolls for feeding tube stock through the machine, a stop located in alignment with the stock after it is fed through the feed rolls, a vise having a stationary jaw and a movable jaw and adapted to clamp the stock in a fixed position at a point between the feed rolls and the stop, said jaws having a groove across the top and a slot in line with the groove and extending through the jaws adjacent the stock, a cutter blade slidably mounted in the groove in said vise jaws in a direction crosswise of the stock and adapted to cut a slot into the stock approximately tangential to the inner diameter thereof, a second cutter blade slidably mounted crosswise of the stock and approximately at right angles to the first cutter blade and adapted to completely sever the stock by penetrating it at the point where it is slotted by the first cutter blade, a main shaft, a clutch mounted on the main shaft and adapted to engage a power source, a gear train driving the feed rolls, a clutch connected to the gear train and adapted to engage a power source, a cam on the main shaft, means connecting said cam and the feed roll clutch whereby the cam regulates the action of the clutch, means connected to the main shaft for driving the cutter blades in sequence, a second cam mounted on the main shaft, and means actuated by said second cam to move the feed rolls bodily in a direction away from the stationary jaw after the severing cut has been made.

2. An automatic tube cut-off machine, which comprises a plurality of opposed feed rolls for feeding tube stock to the machine, a gear train for driving said rolls, a clutch connected to the gear train and adapted to engage a power source, a main drive shaft, a clutch connected to the main drive shaft and adapted to engage a power source, a slidably mounted stop aligned with and moved by the stock as it is fed to the machine, means connecting the stop and the main drive shaft clutch for operating the clutch after a predetermined movement of the stop, a vise so positioned as to clamp the stock at a point between the feed rolls and the stop and comprising a stationary jaw and a movable jaw, means operated by the main drive shaft for actuating the movable vise jaw, a cutter blade slidably mounted in a direction crosswise of the stock for cutting a groove in a wall of that section of the stock held in the vise, a second cutter blade slidably mounted crosswise of the stock at approximately right angles to said first cutter blade and adapted to sever the stock by first entering the groove cut by the first cutter blade at approximately a perpendicular thereto, means connected to the main drive shaft for driving the two cutter blades in sequence, means connected to the main drive shaft for moving the stop out of alignment with the stock and subsequently bringing the stop back down on top of the stock, means connected to the main drive shaft for moving the feed rolls in a direction such that the stock is moved away from the stationary vise jaw, and means connecting the main drive shaft with the feed roll clutch for automatically engaging said clutch with the power source when the main drive shaft clutch becomes disengaged and vice versa.

3. An automatic tube cut-off machine, which comprises a plurality of opposed feed rolls for feeding tube stock through the machine, a stop in alignment with the stock as it is fed into the machine, means for resiliently mounting the stop, means for moving the stock, means for moving the stop out of alignment with the stock and then back on top of the stock as resilient means urge the stop forward, a vise comprising a stationary jaw and a movable jaw adapted to clamp the stock in a fixed position at a point between the feed rolls and the stop, said vise jaws having a groove in corresponding faces and a slot continuing from the bottom of said groove through each vise jaw adjacent the stock-receiving portion thereof, a cutter blade slidably mounted in a direction crosswise of the stock so as to pass through the grooves in the vise jaws and produce a groove in the stock approximately tangential to the inner diameter thereof, a second cutter blade slidably mounted crosswise of the stock and so located as to enter the groove made by the first cutter blade at an angle substantially perpendicular thereto, thus passing through the slots in the vise jaws and severing the stock, a power source, a main drive shaft, a clutch connected to the main drive shaft and adapted to engage the power source, a gear train for driving the feed rolls, a clutch connected to the gear train and adapted to engage a power source, means connected to the main drive shaft for actuating the feed roll clutch, the stop shifting means, the movable vise jaw, and the two cutting blades, an electrical circuit including a switch and a solenoid, means connecting the solenoid and the main drive shaft clutch to cause the latter to engage the power source, and means attached to the stop to operate the electrical switch and energize the solenoid when a given length of stock has been fed to the machine.

4. An automatic tube cut-off machine, which comprises a plurality of feed rolls for feeding tube stock to the machine, a stop located in alignment with and engaged by the stock after it is fed through the feed rolls, a vise adapted to clamp the stock at a point intermediate the feed rolls and the stop and having a stationary jaw and a movable jaw for clamping the stock during a severing action, cutter means for severing the stock, means actuated by the stop when moved by the feeding stock to actuate the cutter means to sever the stock, a slide member for laterally positioning the feed rolls, means operated in timed relation with the cutter means for moving the slide member in a direction such that the feed rolls carry the stock away from the stationary vise jaw after completion of the cutting operation.

5. In an automatic tube cut-off machine having tube cutting means, means for clamping the tube during a cutting off operation, and means for intermittently feeding predetermined lengths of tube to clamping and cutting off position, the provision in connection with said feed means of a set of feed rolls in adjacent relation to the clamping means, a slide carrying said set of rolls and mounted for movements to shift the tube laterally of its feed movement and relative to the clamping means, and means operable after a cutting off operation and a release of the clamping means to shift the slide and thereby move the feed roll set and engaged tube laterally to provide feeding clearance between the tube and clamping means.

6. In an automatic tube cut-off machine having tube cutting means, means for clamping the tube during a cutting off operation, and means for intermittently feeding predetermined lengths of tube to clamping and cutting off position, the provision in connection with said feed means of a set of feed rolls in adjacent relation to the clamping means, means carrying said set of rolls for reciprocatory movements transverse to the line of feed to effect lateral shifting of the tube to and from clamping position whereby the tube when feeding has clearance relative to the clamping means, and means automatically operable in synchronized relation to the tube feeding, clamping and cutting operations to shift the means carrying the set of feed rolls to place the tube in clamping position prior to the cutting operation and in clearance relation to the clamping means during a feeding operation.

FRED GRIEDER.

REFERENCES CITED

The following references are of record in the file of this patent:

UNITED STATES PATENTS

| Number | Name | Date |
| --- | --- | --- |
| Re. 22,114 | Borzym | June 16, 1942 |
| 1,089,273 | Saylor | Mar. 3, 1914 |
| 1,261,305 | Seybold | Apr. 2, 1918 |
| 1,269,635 | Neuman | June 18, 1918 |
| 1,782,692 | Lawson | Nov. 25, 1930 |
| 1,874,296 | Huntsberger | Aug. 30, 1932 |
| 2,247,766 | Boerger | July 1, 1941 |
| 2,260,611 | Di Santo | Oct. 28, 1941 |
| 2,262,599 | Bolz | Nov. 11, 1941 |
| 2,361,595 | Broersma | Oct. 31, 1944 |